United States Patent [19]
Freund et al.

[11] Patent Number: 5,824,388
[45] Date of Patent: Oct. 20, 1998

[54] CLAMPING APPARATUS FOR IMPRINTING DISK-SHAPED INFORMATION MEDIUM

[75] Inventors: Michael Freund, Schorndorf; Alexander Hirsch, Stuttgart, both of Germany

[73] Assignee: Eastman Kodak Company, Rochester, N.Y.

[21] Appl. No.: 727,062

[22] Filed: Oct. 8, 1996

[30] Foreign Application Priority Data

Oct. 12, 1995 [DE] Germany .................. 195 37 921.7

[51] Int. Cl.[6] ............................................ B41F 21/04
[52] U.S. Cl. ............... 428/131; 428/137; 428/64.2; 428/66.6; 428/64.1; 428/119; 428/139; 369/270; 369/271; 269/291; 269/292; 269/297; 269/47; 269/48.1; 269/48.2; 101/35; 101/407.1; 101/408; 101/474; 347/104; 347/4
[58] Field of Search ................ 428/137, 131, 428/64.2, 66.6, 64.1, 119, 139; 369/270, 271; 269/291, 292, 297, 47, 48.1, 48.2; 101/35, 407.1, 474, 408; 347/104, 4

[56] References Cited

U.S. PATENT DOCUMENTS

| | | | |
|---|---|---|---|
| 4,771,890 | 9/1988 | Hofland et al. | 206/445 |
| 5,317,337 | 5/1994 | Ewaldt | 346/1.1 |
| 5,322,079 | 6/1994 | Fukutomi et al. | 134/153 |
| 5,391,231 | 2/1995 | Schertler | 118/503 |
| 5,470,691 | 11/1995 | Arai et al. | 430/273 |
| 5,543,001 | 8/1996 | Casillo et al. | 156/60 |
| 5,616,450 | 4/1997 | Arai et al. | 430/321 |
| 5,637,200 | 6/1997 | Tsymberov | 204/298.15 |

FOREIGN PATENT DOCUMENTS

| | | | |
|---|---|---|---|
| 0252226 | 4/1987 | European Pat. Off. | G11B 23/03 |
| 0628956 | 6/1994 | European Pat. Off. | G11B 7/24 |
| 3721651 | 12/1989 | Germany | B41M 5/00 |
| 195 32 108.1 | 8/1995 | Germany . | |

*Primary Examiner*—William P. Watkins, III
*Attorney, Agent, or Firm*—Raymond L. Owens

[57] ABSTRACT

Clamping apparatus for disk-shaped information medium having a central hole, the disk-shaped information medium having a surface upon which information is to be printed, including a baseplate having holes; a slider guidably mounted on the baseplate for centering the disk-shaped information medium with the central hole; stationary holding elements arranged on the baseplate, and movable holding elements arranged on the slider, in such a way that when an information medium is placed in the clamping apparatus, a predetermined number of the stationary and movable holding elements are arranged along the outer periphery of the information medium, and the remainder of the stationary and movable holding elements are arranged along the inner periphery of the central hole of the information medium; a bottom plate positioned under the baseplate and movable perpendicular thereto; and information medium contact elements which are formed on the bottom plate and adapted to pass through holes in the baseplate and contact the information medium.

9 Claims, 3 Drawing Sheets

CLAMPING APPARATUS FOR IMPRINTING DISK-SHAPED INFORMATION MEDIUM

FIELD OF THE INVENTION

The invention concerns a clamping apparatus for a disk-shaped information medium upon which information can be printed.

BACKGROUND OF THE INVENTION

Label information or other decorative patterns are applied onto disk-shaped information medium. The labels or patterns can involve both text and graphics. The label information provides the user with, for example, information about the content of the information medium. Optical disks, called "compact disks or CDs", bear the label information on one side of the information medium. The label information can be applied with conventional printing processes. Inkjet printing is a preferred printing process for disk-shaped information medium, since with this the labels can be individually configured in terms of both graphics and information content.

A method for printing plate-shaped information medium is disclosed in German Published Application DE-A-37 21 651. In a first embodiment, the information medium is mounted on the rotation axis of a drive means, and caused to rotate. The printing head of an inkjet printer moves radially over the surface to be printed. In a second embodiment, the information medium is laid on two parallel transport belts which impart a linear motion to the information medium. The inkjet printing head moves perpendicular to the linear motion of the transport belts.

European Patent Application EP-A-0 628 956 discloses an optical information medium and a method for its manufacture. A protective layer covered by a hydrophilic film is provided on the disk. This film can easily be printed with an inkjet printer which uses water-based inks. For this purpose, the disk is disposed in a rectangular holder which has an opening that is somewhat larger than the diameter of the disk. The disk itself lies on a step of the holder in such a way that the surface to be printed faces toward the inkjet printing head. The holder is moved by means of a transport table in the printing apparatus.

European Patent Application EP-A-0 252 226 describes a storage and packaging system for optical disks. The system consists substantially of a baseplate molded of plastic, shaped into which is a flat circular depression. The radially peripheral wall of the depression comprises guide surfaces that prevent movement of the plate in the diagonal direction. An additionally provided spring prevents, with its spring force, any movement of the plate, which is thus positioned in the circular depression by at least three elements. Information medium cannot, however, be held with this apparatus and fed into a printing apparatus.

Pending German application number 195 32 101.3, filed Aug. 31, 1995 discloses a clamping apparatus for printing disk-shaped information medium that includes a baseplate with a central centering aid for the information medium and a cover with an annular opening. The baseplate is pivotedly joined to the cover by means of a hinge. A closure mechanism is provided diametrically opposite the hinge, and fastened onto the baseplate are elastic elements on which the information medium rests, and which when the cover is closed can be compressed by the information medium. This apparatus ensures a constant distance between the surface of the information medium and the printing head, but it is not suitable for use in an automatic environment.

The retainer (caddy) described above for printing information medium meets the criterion that the surface of the information medium be at a constant distance from the printing head of the printing apparatus. The apparatus is not suitable, however, for use in an automatic environment. In addition, the outer edge of the information medium is severely stressed mechanically by the cover of the clamping apparatus.

SUMMARY OF THE INVENTION

It is an object of the invention to provide a clamping apparatus for disk-shaped information medium which solves the above-noted problems.

A further object of the invention is that the apparatus has a simple construction, and reliably and automatically centers the information medium in the clamping apparatus.

This object is achieved in a clamping apparatus for disk-shaped information medium having a central hole, the disk-shaped information medium having a surface upon which information is to be printed, comprising:

a baseplate having holes;

a slider guidably mounted on the baseplate for centering the disk-shaped information medium with the central hole;

stationary holding elements arranged on the baseplate, and movable holding elements arranged on the slider, in such a way that when an information medium is placed in the clamping apparatus, a predetermined number of the stationary and movable holding elements are arranged along the outer periphery of the information medium, and the remainder of the stationary and movable holding elements are arranged along the inner periphery of the central hole of the information medium;

a bottom plate positioned under the baseplate and movable perpendicular thereto; and information medium contact elements which are formed on the bottom plate and adapted to pass through holes in the baseplate and contact the information medium.

The advantage of the apparatus according to the invention is that the surface of the information medium to be printed is at a constant distance from the printing head of the printing apparatus. The information medium with the central hole is provided in a clamping apparatus which includes a baseplate a slider guided thereon to center the information medium, and a bottom plate movable perpendicular to the baseplate. Holding elements are attached to the movable slider in such a way that when an information medium has been provided in, the holding elements are arranged along the outer periphery and along the inner periphery of the central hole of the information medium. A bottom plate provided beneath the baseplate has extensions which serve as contact elements for the information medium. The contact elements pass through holes in the baseplate in order to come into contact with the information medium. Movement of the bottom plate is controlled by an elliptical element on which a rod with a roller is attached. As the clamping apparatus moves into the transfer position, the roller rolls on an inclined plane, as a result of which the position of the elliptical element between the bottom plate and baseplate changes. The bottom plate presses the information medium with the contact elements against the collars of the holding elements, achieving automatic clamping of the information medium.

In addition, the information medium cannot slip out of the caddy or the clamping apparatus during operation. To achieve this, the information medium is immobilized in the clamping apparatus by the holding elements. The holding elements are preferably mushroom-shaped, the collars of the holding elements projecting beyond the outer edge, or inner edge of the central hole, of the information medium.

A further advantage of the apparatus according to the invention is that the bottom plate is preloaded with respect to the baseplate with elastic elements, preferably compression springs. The result is that the information medium is spring-loaded against the collars of the mushroom-shaped holding elements, thus correcting for variations in thickness of the information medium.

DETAILED DESCRIPTION OF THE INVENTION

The description below is limited to optical information medium (CDs) which are formed without information on their surface. It is self-evident to one skilled in this art that other information medium can also be printed with the apparatus according to the invention.

Figure 1:
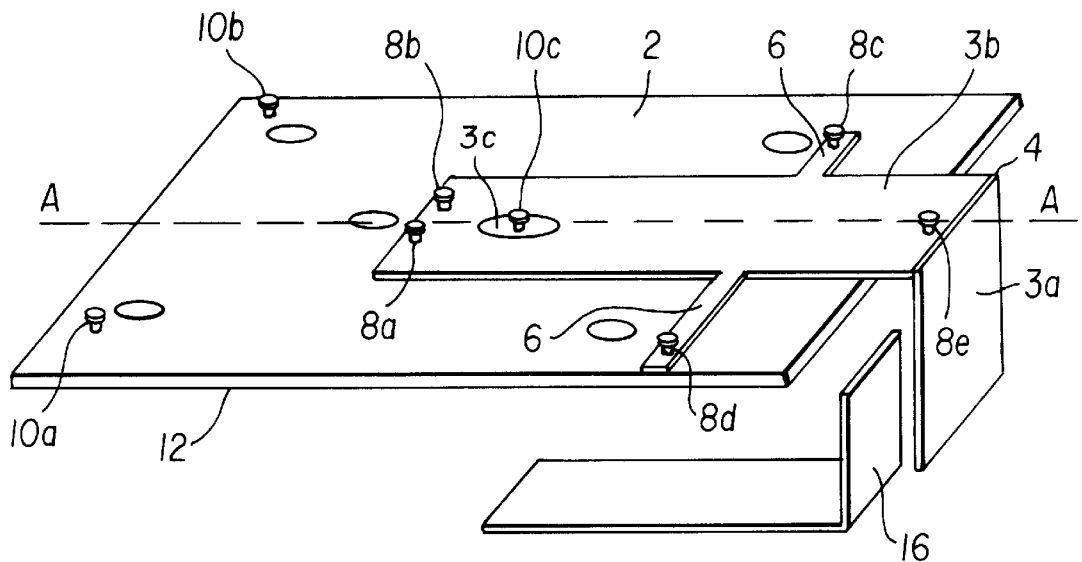
FIG. 1 shows a perspective depiction of the clamping apparatus according to the invention.

The clamping apparatus (see FIG. 1) includes a baseplate 2 on which a movable slider 4 is guided. Slider 4 is substantially L-shaped, a short arm 3a of the slider 4 pointing downward from the surface of baseplate 2. Also provided, at a right angle on either side of a long arm 3b of the slider 4, are two narrow extensions 6, which are also movable together with slider 4. The linear movement of slider 4 is delimited by a stop 16 that interacts with short arm 3a of the slider 4. Joined to slider 4 are first holding elements 8a, 8b, 8c, 8d and 8e, which when slider 4 moves execute a relative movement parallel to the surface of baseplate 2. A second set of holding elements 10a, 10b and 10c is rigidly joined to baseplate 2. Present in long arm 3b of slider 4 is an elongated opening 3c so that slider 4 is not limited in its linear movement by holding element 10c joined to baseplate 2. Provided below baseplate 2 is a bottom plate 12 that is movable perpendicular to baseplate 2.

Figure 2:
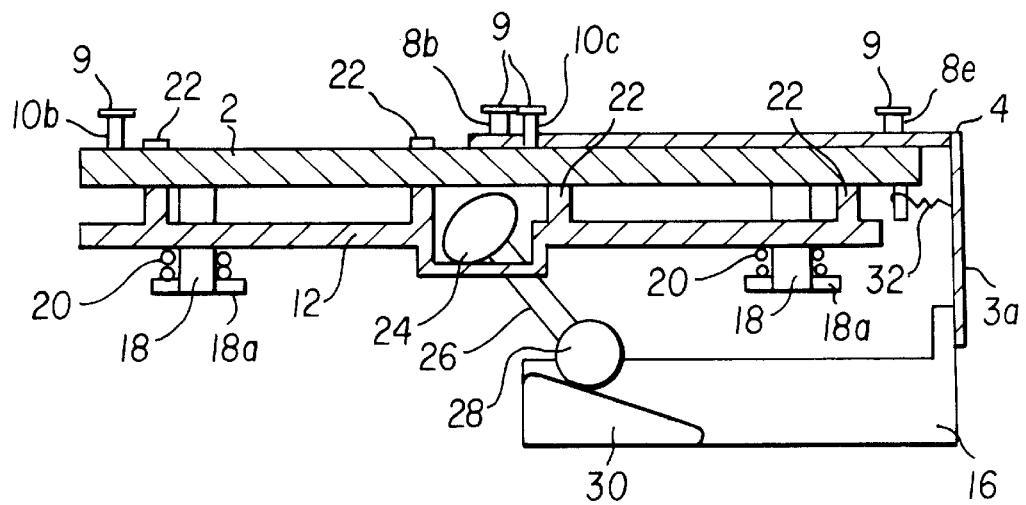
FIG. 2 shows a cross section along line A—A of the clamping apparatus of FIG. 1, the holding elements and slider being located in the receiving position for an information medium.

FIG. 2 shows the apparatus according to the invention in cross section along line A—A. Baseplate 2 and bottom plate 12 are arranged substantially parallel to one another. Attached to baseplate 2 are extensions 18 which pass downward through bottom plate 12, and an enlargement 18a is shaped onto each free end thereof. Provided between enlargement 18a and the underside of bottom plate 12 are compression springs 20 which press bottom plate 12 toward baseplate 2. Bottom plate 12 is also equipped with a plurality of contact elements that pass vertically upward through baseplate 2. Contact elements are generally cylindrical in shape, and can possess at their ends elastic elements (not depicted) which are arranged so that an information medium 34 (FIG. 7) comes to rest on them. Holding elements 8a to 8e and 10a to 10c are mushroom-shaped, with a collar 9 that is located on a single plane for all holding elements 8a to 8e and 10a to 10c. Provided between baseplate 2 and bottom plate 12 is an elliptical element 24 that is rigidly joined to a rod which bears at its other end a roller 28. Roller 28 slides on an inclined plane 30 that is attached to stop 16.

Slider 4 is preloaded with respect to baseplate 2 with a spring 32. In the position depicted in FIG. 2, the fact that short arm 3a of slider 4 rests against stop 16 prevents the slider from movement. In this position the clamping apparatus is ready to receive an information medium.

Information medium 34 with a central hole 35 is retained at the edge by two gripper arms 36 (see FIG. 3), and transferred to clamping apparatus in movement direction B. By means of stop 16, slider 4, together with holding elements 8a to 8e arranged thereon, is also pushed in movement direction B. As a result the clearance between movable holding elements 8a, 8b and fixed holding element 10c decreases so that the clearance is less than the diameter of central hole 35. Information medium 34 thus fits easily over the three enclosing holding elements 8a, 8b and 10c. The remaining movable holding elements 8c, 8d and 8e also move away outward (in movement direction B) to correspond with the slider movement, so that information medium 34 can be laid down gently.

Figure 3:
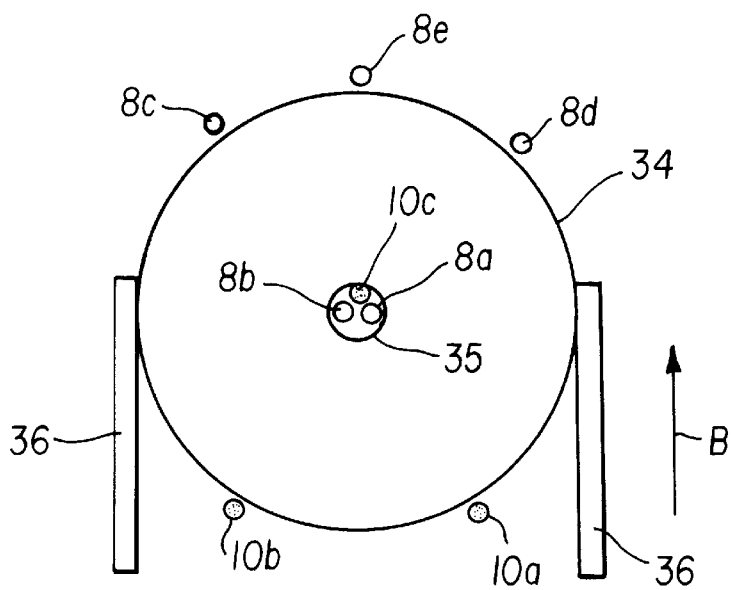
FIG. 3 shows a plan view of an information medium being provided in the clamping apparatus by a gripper system.
Figure 4:
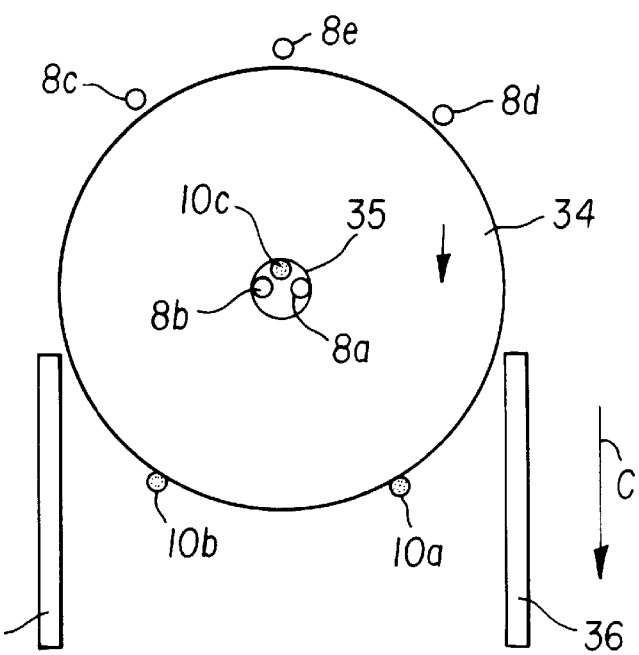
FIG. 4 shows a plan view similar to the one of FIG. 3, in which the gripper system is leaving the information medium provided in the clamping apparatus.

FIG. 4 shows, in a view corresponding to FIG. 3, the procedure by which gripper arms 36 leave the transfer position by means of a movement within the plane of information medium 34. The movement direction is depicted by arrow C, and is opposite to movement direction B of FIG. 3. Information medium 34 is thereby automatically held back by fixed holding element 10c located inside central hole 35. Information medium 34 is thereby laid on the bottom of baseplate 2 of the clamping apparatus.

Figure 5:
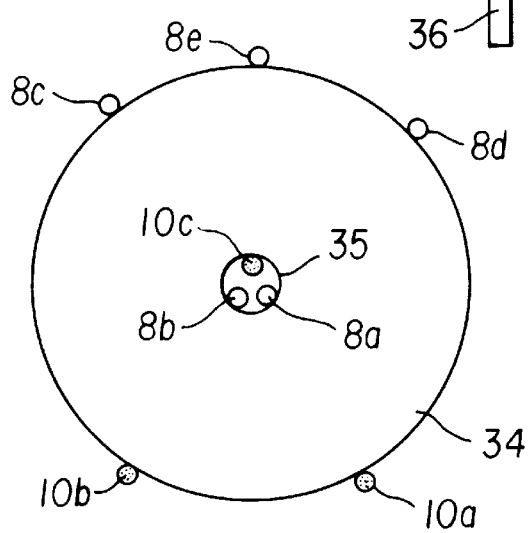
FIG. 5 shows a plan view similar to the one of FIG. 3, which depicts the positioned and clamped information medium.

Once gripper arms 36 and the clamping apparatus have left the transfer position (see FIG. 2) for information medium 34, spring 32 provided between slider 4 and baseplate 2 causes slider 4 to make a small movement. This slider movement centers the information medium on baseplate 2 (see FIG. 5). Holding elements 8a, 8b and 8c located inside central hole 35 rest with their stems against the inner periphery of central hole 35, thus achieving centering of information medium 34. Holding elements 8c, 8d, 8f, 10a and 10b are arranged around the outer edge of information medium 34, and constitute a three-dimensional immobilization system for information medium 34.

Figure 6:
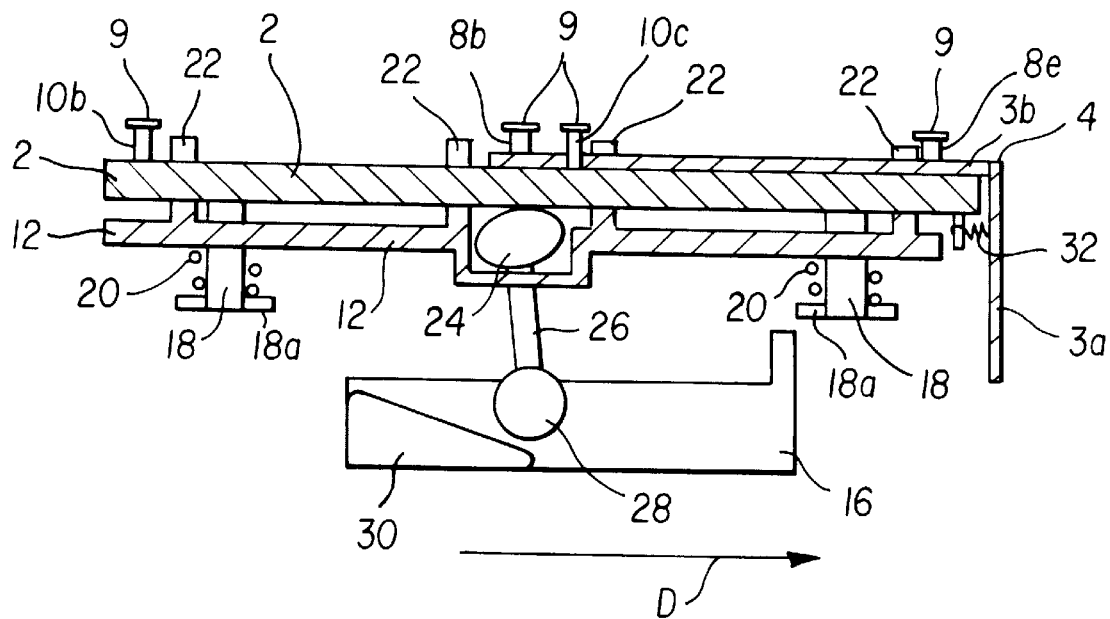
FIG. 6 shows a cross section along line A—A of the clamping apparatus according to the invention, the holding elements and slider being located n the position which completes clamping of the information medium.

FIG. 6 is a depiction corresponding to FIG. 2, in which the clamping apparatus has left the transfer position. When the clamping apparatus has moved (see arrow D) away from the transfer position for information medium 34 depicted in FIG. 2, short arm 3a of slider 4 is no longer resting against stop 16. Spring 32 thus pulls slider 4 back, causing the clearance between central holding elements 8a, 8b and 20c to increase. The movement of slider 4 is limited by the diameter of central hole 35 in information medium 34. This means that the movement of slider 4 is halted when central holding elements 8a, 8b and 10c are in contact with the inner periphery of central hole 35 of information medium 34. The clamping apparatus continues to move in the direction of arrow D, so that roller 28 rolls on inclined plane 30. As a result, elliptical element 24 located between baseplate 2 and bottom plate 12 rotates into a position such that the minor axis of elliptical element 24 spaces baseplate 2 apart from bottom plate 12. As a consequence of this, springs 20 push baseplate 12 upward, so that contact elements 22 are pressed against information medium 34 provided in the clamping apparatus. Reliable and accurate positioning of information medium 34 in the clamping apparatus is thus achieved.

Figure 7:
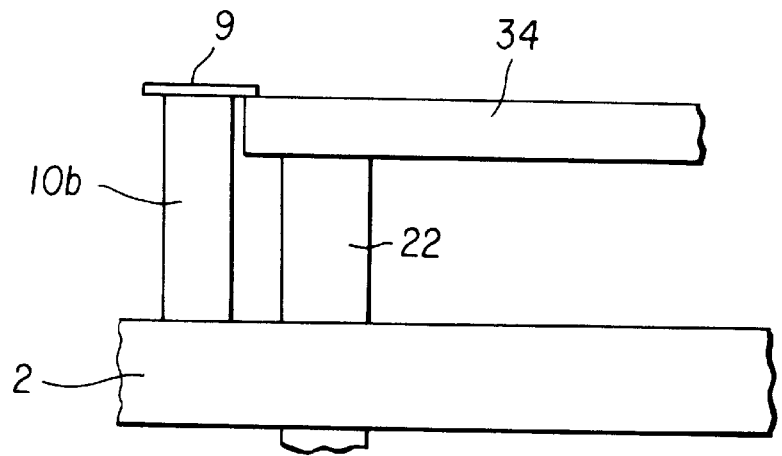
FIG. 7 shows a partial view in cross section, in which an information medium is provided in the clamping apparatus.

The position of information medium 34 in the clamping apparatus is illustrated by FIG. 7. As already mentioned, baseplate 12 executes an upward movement due to the pressure of springs 20. Contact elements 22 of baseplate 12 thus contact information medium 34 provided in the clamping apparatus and lift it until it is pressed against collars 9 of mushroom-shaped holding elements 8a to 8e and 10a to 10c. The mushroom-shaped holding elements 8a, 8b and 10c located inside central hole 35 of the information medium touch the inner periphery of the information medium with their stems, thus achieving centering. The mushroom-shaped holding elements 8c, 8d, 8e, 10a and 10b arranged around the outer edge of information medium 34 touch the information medium only with collars 9, which are enlarged by comparison with the stem. The height of collar 9 is such that it is less than the distance between the printing head (not depicted) and the surface of information medium 34.

The present invention was described with reference to a preferred embodiment, but of course modifications can be made within the skill of a skilled person, without thereby leaving the scope of the claims which follow.

Parts List 2 baseplate
3a short arm
3b long arm
3c elongated opening
4 slider
6 extensoins
8a holding element
8b holding element
8c holding element
8d holding element
8e holding element
9 collar
10a holding element
10b holding element
10c holding element
12 bottom plate
16 stop
18 extensions
18a enlargement
20 compression springs
24 elliptical element
28 roller
30 inclined plane
32 spring
34 information medium
35 central hole
36 gripper arms

We claim:

1. Clamping apparatus for a preselected size disk-shaped information medium having a central hole, the disk-shaped information medium having a surface upon which information is to be printed, comprising:

a baseplate having holes;

a slider guidably mounted on the baseplate for centering the disk-shaped information medium with the central hole;

stationary holding elements arranged in first and second circular patterns on the baseplate, and movable holding elements arranged in third and fourth circular patterns on the slider, in such a way that when a disk-shaped information medium is placed in the clamping apparatus the first circular pattern of the stationary holding elements and the third circular pattern of the movable holding elements are arranged along the outer periphery of the disk-shaped information medium, and the second and fourth circular patterns of the stationary and movable holding elements, respectively, being arranged along the inner periphery of the central hole of the disk-shaped information medium;

a bottom plate positioned under the baseplate and movable perpendicular thereto; and information medium contact elements which are formed on the bottom plate and adapted to pass through holes in the baseplate and contact the disk-shaped information medium.

2. Clamping apparatus according to claim 1, characterized in that one of the stationary holding elements and two of the movable holding elements are provided inside the central hole of a disk-shaped information medium that has been placed in the clamping apparatus; and that two of the fixed holding elements and three of the movable holding elements are arranged along the outer periphery of the disk-shaped information medium, in such a way that the disk-shaped information medium is fixed in position.

3. Clamping apparatus according to claim 1, characterized in that the holding elements are mushroom-shaped and have a stem and a collar.

4. Clamping apparatus according to claim 3 further including an inkjet print head spaced from a surface of the disk-shaped information medium placed in the clamping apparatus, characterized in that the collar of the mushroom-shaped holding elements is configured in such a way that its height is substantially less than the distance between the surface of the disk-shaped information medium and the inkjet printing head.

5. Clamping apparatus according to claim 3, characterized in that the mushroom-shaped holding elements are arranged at the outer periphery in such a way that the stem of the mushroom-shaped holding elements does not contact the information medium; and that the mushroom-shaped holding elements inside the central hole of the information medium touch the inner periphery of the central hole with the stem.

6. Clamping apparatus according to claim 1 further including first elastic elements which act upon the bottom plate which provide a force for moving the bottom plate with respect to the baseplate and second elastic elements which act upon the slider to move it relative to the baseplate.

7. Clamping apparatus according to claim 6, characterized in that the first and second elastic elements are helical springs.

8. Clamping apparatus according to claim 6 further including an inclined plane, a roller which runs on the inclined plane and a rod which engages the roller and an elliptical element disposed between the bottom plate and the base plate and which engages the rod arranged in such a way that the elliptical element is movable from a first position in which it spaces the baseplate away from the bottom plate against the force of the first elastic elements, into a second position in which it releases the bottom plate for a movement toward the baseplate.

9. Clamping apparatus according to claim 4, characterized in that the information medium can be pressed, by the contact elements joined to the bottom plate against the collars of the mushroom-shaped holding elements as a result of which a constant distance from the inkjet printing head.

* * * * *